Patented Mar. 3, 1936

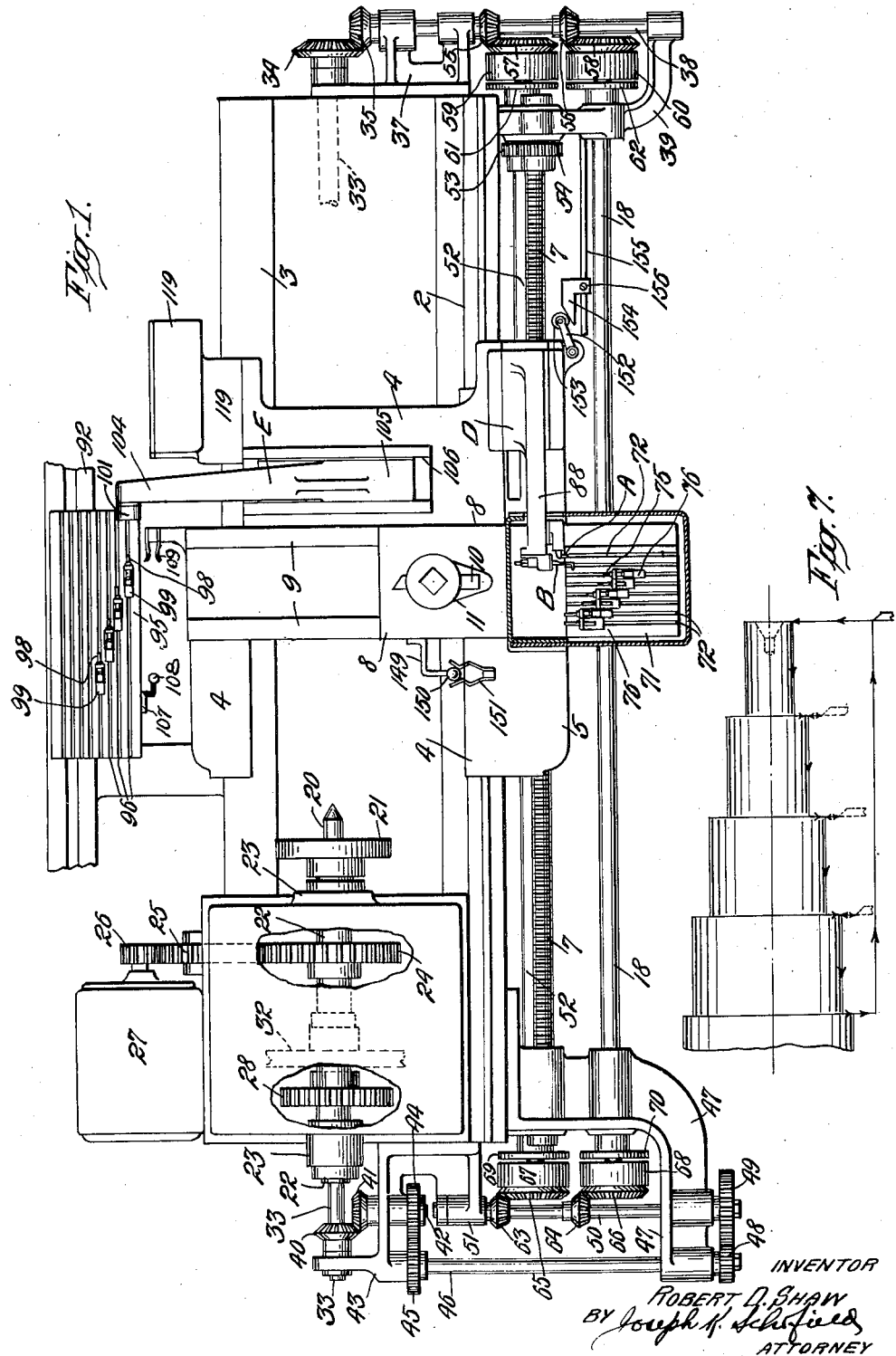

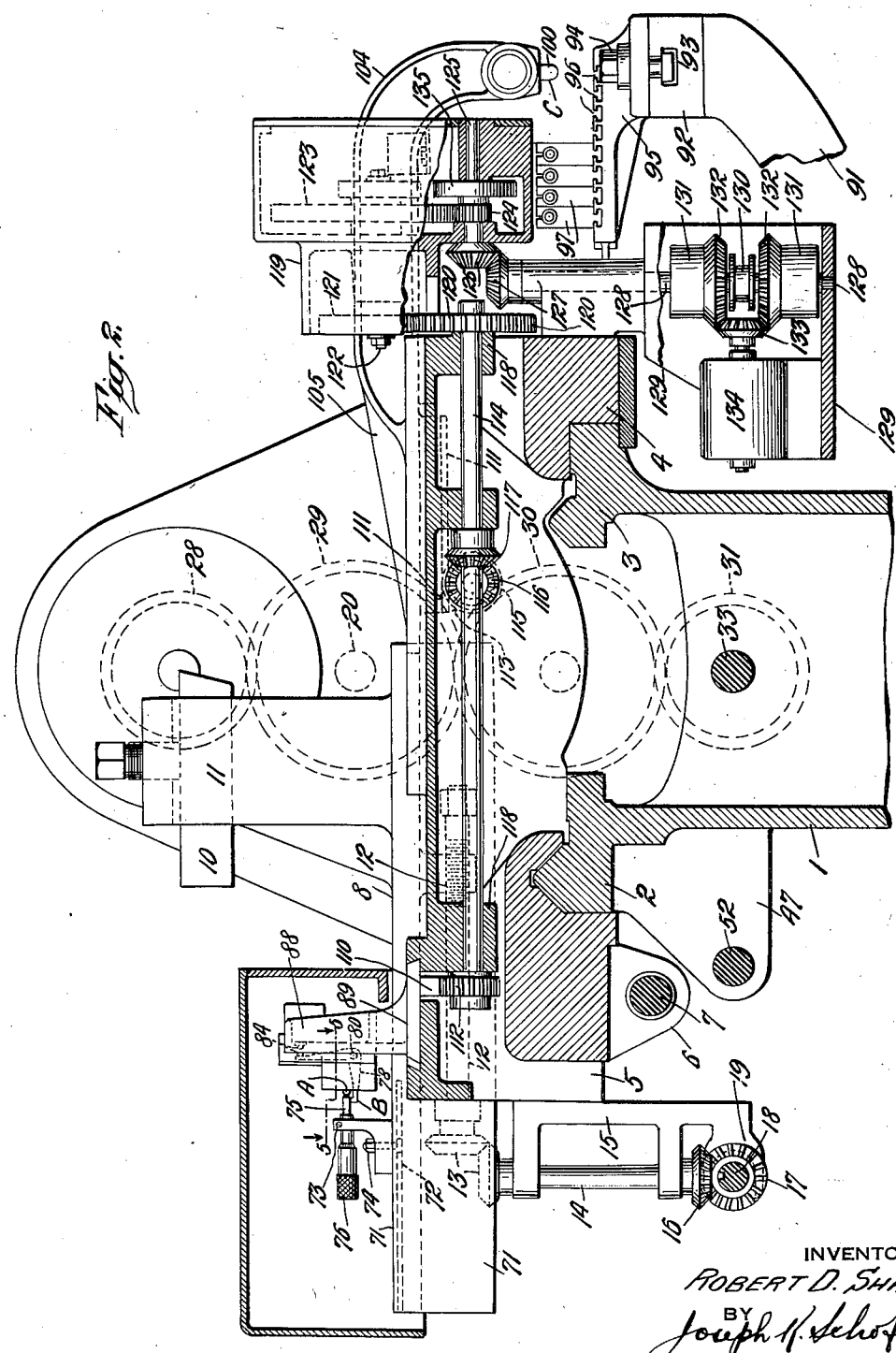

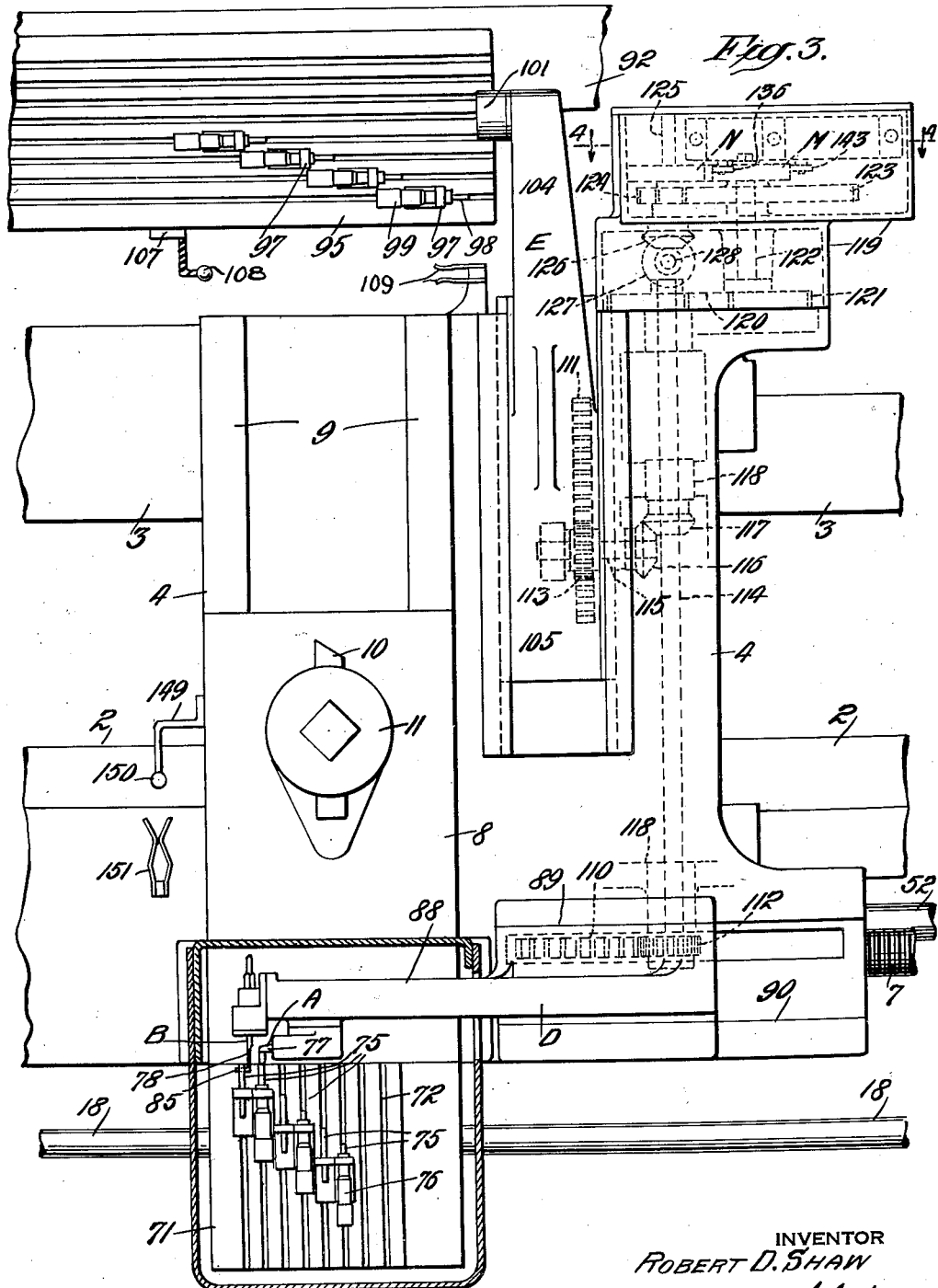

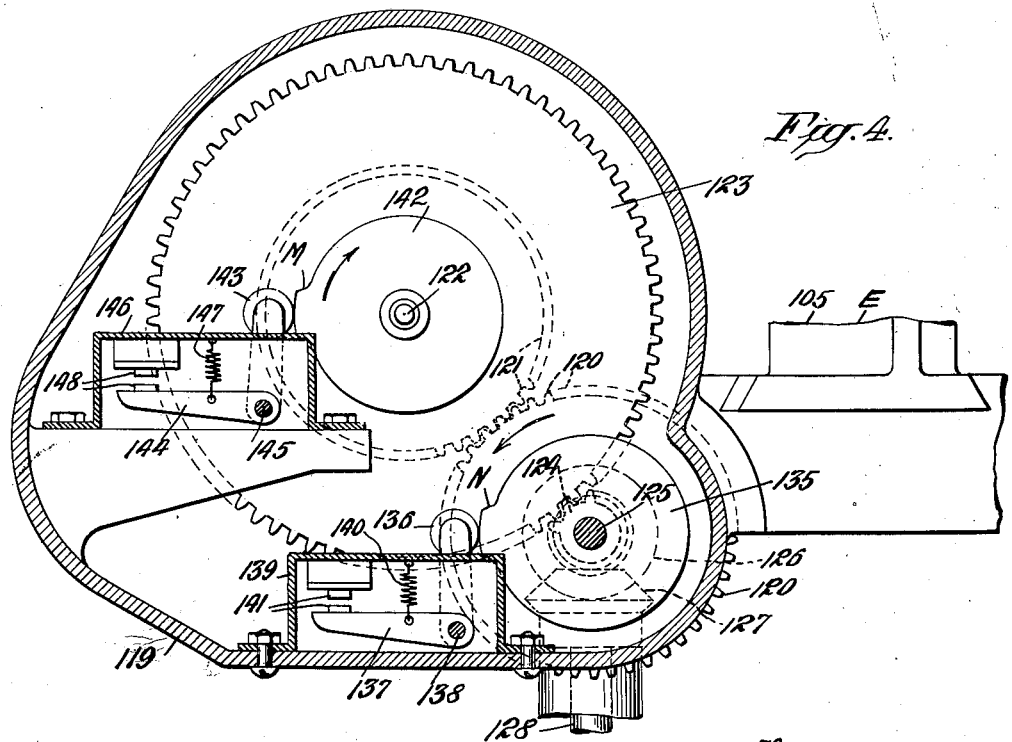
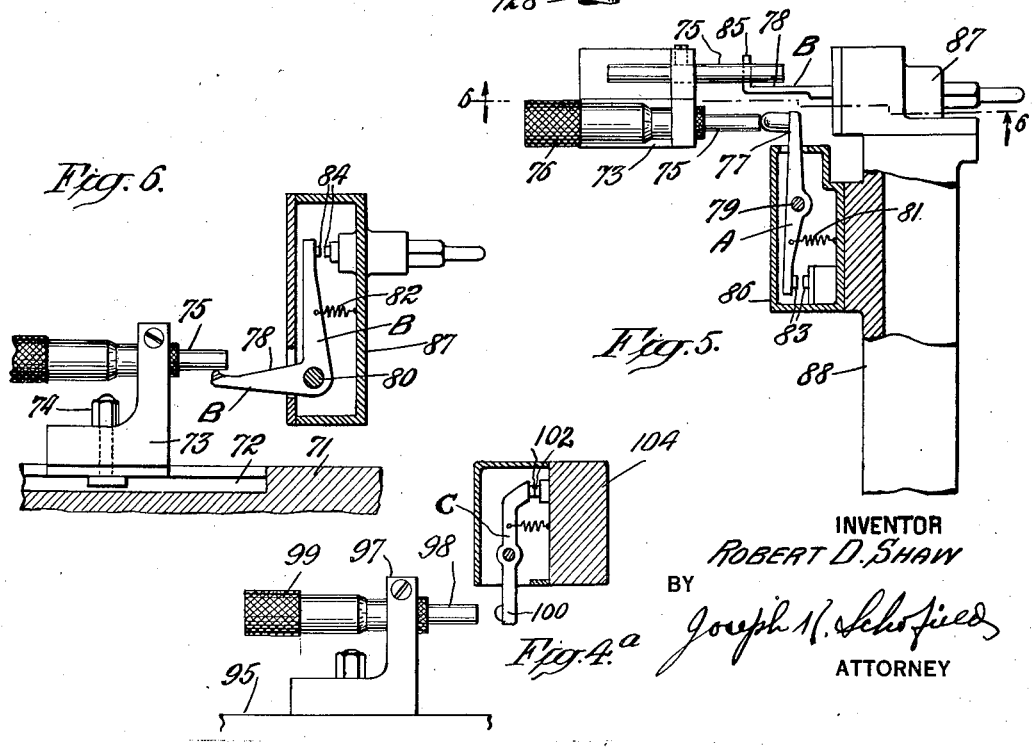

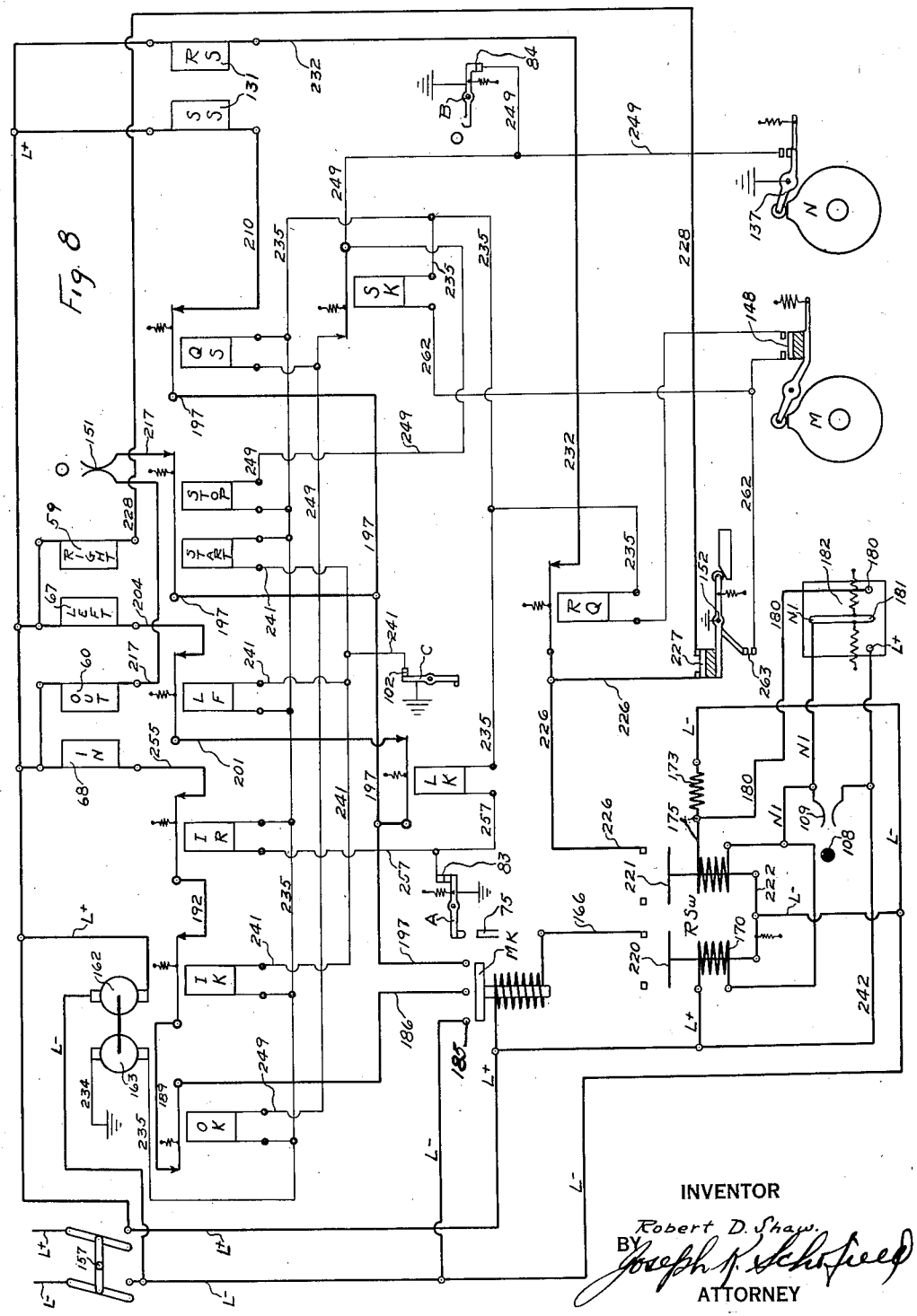

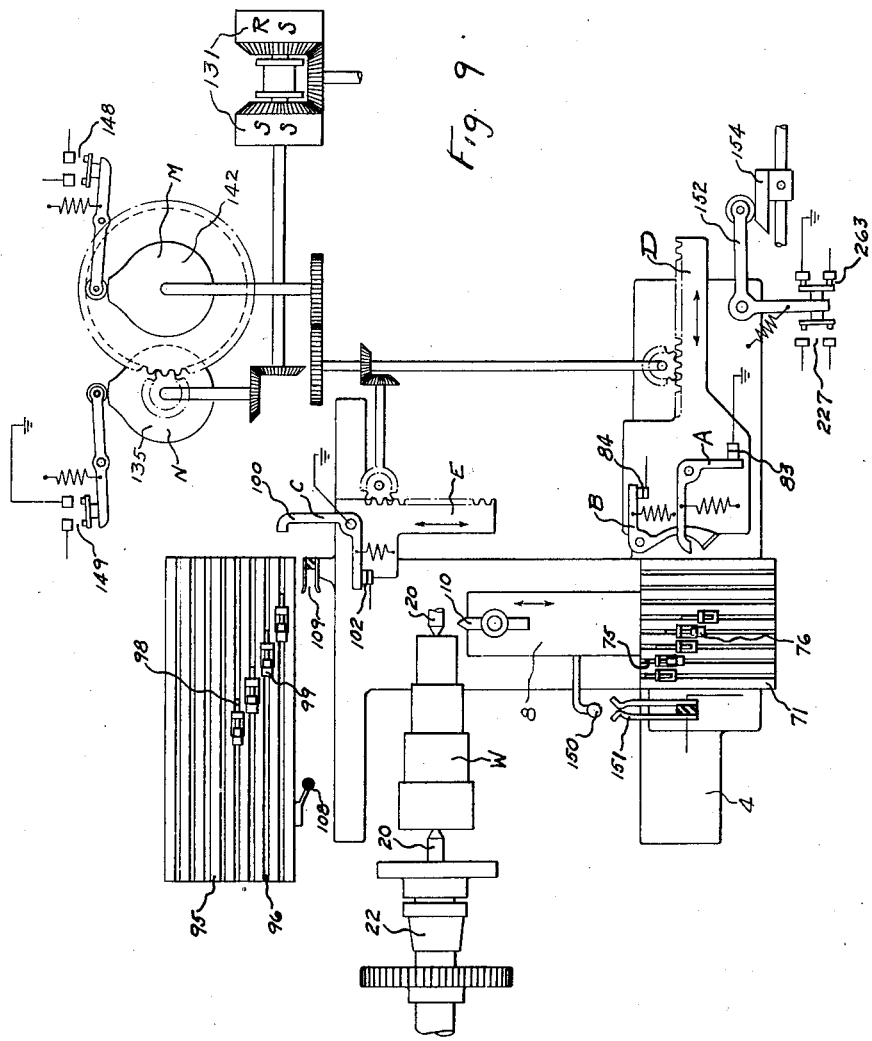

2,032,598

UNITED STATES PATENT OFFICE 2,032,598

AUTOMATIC ELECTRICALLY OPERATED LATHE FOR MULTIPLE DIAMETER TURNING

Robert D. Shaw, Hartford, Conn., assignor to Pratt & Whitney Company, Hartford, Conn., a corporation of New Jersey Application June 16, 1934, Serial No. 730,894

28 Claims. (Cl. 82—21)

This invention relates to machine tools provided with a rotatable work support and movable tool supports, and having magnetic clutches for effecting relative transverse and longitudinal feed movements between said supports, the movements being automatically controlled for cutting successive steps of different diameters in the work.

The relative longitudinal and transverse feeding movements between the tool and the work for cutting the successive steps or diameters are arranged to be controlled automatically by the operation of suitable switches and contactors, certain of which are arranged to be operated by actuators brought into engagement with their contactors by relative movements of the supports.

Preferably the controlling switches and contactors control the operation of a plurality of interlock relays, and relays which cooperate therewith, and are arranged to control electric circuits for energizing and de-energizing the respective magnetic clutches to actuate the tool supports in prearranged sequence so that a cycle of operations on a work piece may be carried out and the members returned to initial positions automatically.

While the arrangement of circuits, relays, control switches and contactors may be utilized in connection with various types of machine tools having carriages or slides mounted for relative transverse and longitudinal feed movements between the tool and the work, the arrangement herewith shown and described is more particularly adapted for the automatic control of a metal turning lathe arranged for turning or cutting the work in successive steps disposed longitudinally along the work, the work being supported and rotated in the usual or any preferred manner. As usual the tool is mounted for transverse feed movements upon a cross slide and for longitudinal movements of the tool the cross slide is mounted upon the usual main or longitudinal carriage. The slide and carriage are arranged to be operated by magnetic clutches and provision is made for alternate transverse and longitudinal movements between the work and the tool for cutting successive steps of different diameters along the work. These movements being effected automatically by the electric circuits controlling the energizing of the magnetic clutches and the circuits being opened and closed by contactors some of which are moved to successively different operative positions during the cycle of operation, this movement or setting of the contactors being effected entirely automatically. Hence an important feature of the improvement is that the relative movements are arranged to be effected by magnetic clutches operating the usual feed screws, thereby permitting, through the contactors and relays, a control such that the movements of the carriage and tool slide automatically follow a prearranged cycle, the distances movable by the carriage and slide being adjustable in the different parts of the cycle.

For turning successive steps on work mounted in the lathe, automatic control of the relative movements of the tool is preferably arranged so that the circuits for energizing the respective magnetic clutches for the transverse and longitudinal movements of the carriage and slide respectively are controlled by contactors operated by these members in their respective movements. These contactors control the sequence of movements for cutting the steps and also control the return of the carriage and slide to their starting positions at the completion of the cycle. Some of the relays in circuit with the contactors and/or switches are operated by the carriage and slide directly and others interlock to control the successive settings of the contactors and thereby control the period of energization of the respective magnetic clutches for the successive transverse and longitudinal movements of the tool.

One object of the invention is to provide means for starting the cycle of movements from an initial position of the tool relative to the work and thereafter automatically control the successive and alternate transverse and longitudinal movements of the tool so as to first position the tool radially of the work for the first cut, make the first longitudinal cut and similarly and repeatedly position the tool transversely of the work at different radial distances from the axis of the work and make each successive longitudinal cut, the transverse and longitudinal movements being adjustable for cutting each step, and the successive movements of the carriage and slide following in prearranged sequence and then being returned to their initial positions at the completion of operation upon the work piece.

A further object is to provide suitable operating mechanism and electrical control devices operating through magnetic clutches for automatically making the successive settings between spaced actuators and adjustable stops for operating control contactors arranged to operate relays, circuits and interlocks for determining the relative positioning of the tool and the work for the successive steps on the work.

A still further object of the invention is to provide automatically operating control mechanism for the circuits, relays and clutches for effecting movements for restoring the transverse and longitudinal slides to their initial positions, and to automatically, in proper sequence, effect the return of the control contactors (set slides) to their initial positions, after which the cycle may be again started or repeated by the operation of a manual starting key.

A feature of particular importance in the present invention and which enables accurate positioning of the tool transversely or radially of the work to maintain accurate sizes of duplicate work is that the position of the tool for each successive diameter on the work is set by limiting an inward movement of the tool carrying cross slide.

Another feature of importance is that the transverse inward movement of the tool and its longitudinal feeding movement are stopped by opening the control circuits therefor rather than by closing a control circuit.

And finally it is an object to provide means whereby the longitudinal and successive transverse movements of the tool are interlocked so that but one motion of the tool can take place at any one time, this object being accomplished by the provision of a special main interlock switch in the circuits controlling the magnetic clutches.

The present invention constitutes an improvement and development of the lathe shown and described in my co-pending application for an Automatic Lathe Serial No. 665,566, filed April 11, 1933.

With the above stated and other objects in view my invention includes the features of construction and operation set forth in the following specification and illustrated in the accompanying drawings.

In the accompanying drawings annexed hereto and forming a part of this specification, I have shown my invention embodied in a lathe particularly adapted for cutting motor shafts having a plurality of successively different and increasing diameters but it will be understood that the invention can be otherwise embodied and that the drawings are not to be construed as defining or limiting the scope of the invention, the claims appended to this specification being relied upon for that purpose. It is to be understood also that changes and modifications may be made within the scope of the appended claims without departing from the spirit of the invention.

The present improvement as adapted for a lathe of the above referred to type is shown in the accompanying drawings, in which Fig. 1 is a plan view of a complete lathe with parts broken away to more clearly disclose its construction; Fig. 2 is a vertical transverse section through the main carrage looking to the left in Fig. 1, one of the contactors being shown in an extreme rear position; Fig. 3 is an enlarged plan view of the carriage and cross slide shown in Fig. 1; Fig. 4 is the contactor positioning cam control mechanism from the rear of the lathe shown in vertical section on the line 4—4 of Fig. 3; Fig. 4a is a fragmentary rear elevation of a contactor on the carriage adjacent the sequence setting device for controlling the longitudinal positions of the tool at which the tool is moved to other transverse positions; Fig. 5 is an enlarged fragmentary plan view of the end of the contactor carrying slide for determining the transverse positions of the tool at successive longitudinal positions along the lathe with a section taken on the line 5—5 of Fig. 2; Fig. 6 is a fragmentary side view of the contactors shown in Fig. 5 in vertical section along the line 6—6 of Fig. 5; Fig. 7 is a diagram showing the movements of the tool for a particular specimen four diameter work; Fig. 8 is a complete wiring diagram showing the operating and control circuits for the machine; and Fig. 9 is a diagram of the movable members of the machine and switches operated thereby.

Referring more in detail to the drawings and to the following description, it will be observed that the present improvement is arranged to automatically control the movements of a single cutting tool for turning successive steps on a work piece in a lathe of the usual or any preferred construction wherein a frame or bed 1 is formed with longitudinally extending ways 2 and 3 along which the usual main or longitudinal carriage 4 is movable. This longitudinally movable carriage is provided with a depending front apron 5 and a downwardly extending lug 6 (Fig. 2) which is threaded to form the usual nut for co-operation with a lead screw 7, rotation of which is adapted to effect longitudinal movements of the tool 10 by movement of the carriage 4 to the right or to the left according to the direction of rotation of the screw.

For transverse movements of the tool 10 the usual cross slide 8 is slidably mounted upon transverse ways 9 mounted upon or forming a part of the longitudinally movable carriage 4. The lathe tool 10, which may be of the usual side cutting form, is mounted in the usual or any suitable way upon a tool post 11, supported on the cross slide 8, the tool being arranged to cooperate with the work W, supported and rotated by the lathe spindle in any usual manner. The transverse movements of the tool 10 toward and from the work may be effected in the usual manner as by moving the cross slide by a suitably mounted feed screw 12 shown in dotted lines in Fig. 2. In the present instance this screw 12 is arranged to be rotated by bevel gears 13, one on the end of the screw 12 and one on a vertically disposed shaft 14 supported in a bearing bracket 15, carried by the apron 5 of the longitudinal carriage 4 as will be seen in Fig. 2.

The vertical shaft 14 is connected by means of bevel gears 16 and 17 with a longitudinally extending spline shaft 18 on which the lower bevel gear 17 is keyed and arranged to slide with the carriage 4, by means of a yoke 19 engaging an annular groove in the hub collar of the bevel gear 17. Since the bracket 15 and shaft 14, with the bevel gears 16 and 17 are arranged to travel longitudinally with the carriage 4, it will be seen that by rotating the spline shaft 18, the transverse movement of the cross slide 8 can be effected in any longitudinal position of the main slide or carriage 4.

The lathe is provided with the usual work supporting centers 20, the tail stock and its center being omitted from the constructional figures for clearness. For most work, it may be preferable to use a face plate 21, the work being rotated by rotating the spindle 22 in the usual head stock bearings 23, the spindle 22 being driven for rotating the work in the usual or any preferred manner. In the present instance and for illustration, a gear 24 is mounted on the spindle 22 and geared by means of any suitable selective intermediate gears 25 with a pinion 26 on the shaft of a motor 27 so that the work is rotated thereby.

Obviously, rotation of the lead screw 7 for longitudinal movements, and of the spline shaft 18 for transverse movements of the tool can be effected in any usual or preferred manner, and the usual change gear mechanisms and devices for varying the relative speeds of the forward and return movements of the tool may be employed. For purposes of illustration these movements are, in the present instance, arranged to be effected from the motor 27. For this purpose, the spindle 22 is provided with a gear 28, Figs. 1 and 2, which cooperate with intermediate gears 29, 30 and 31, which may be supported on a vertically disposed bracket 32, indicated in dotted lines in Fig. 1. The lowermost gear 31 (Fig. 2) is mounted on a longitudinally extending shaft 33 and rotates the same in unison with the work spindle 22. The shaft 33, as indicated in Fig. 1, is rotatably supported longitudinally of the bed 1 of the lathe by suitable bearings in brackets 37 and 43. At the right hand end, as seen in Fig. 1, this shaft 33 is provided with a bevel gear 34, meshing with a bevel pinion 35 on the end of a shaft 36 rotatably supported in a bearing bracket 37 mounted on the end of the lathe bed 1. The shaft 36 extends into a bearing in a supporting bracket 39 mounted on the bed of the lathe, on the front thereof as shown in Fig. 1.

The left end of the longitudinal shaft 33 is preferably provided with a smaller bevel gear 40 meshing with a similar bevel pinion 41 on the end of a stud shaft 42 mounted in a bracket 43, mounted on the left end of the lathe bed, which also provides a bearing for the end of longitudinal shaft 33. The stud shaft 42 carries a spur gear 44 meshing with a similar gear 45 on the end of a transverse shaft 46 rotatably mounted in bearings in the bracket 43 and in the curved bracket 47 mounted on the front of the lathe bed near the left end as indicated in Fig. 1. The end of the shaft 46 carries a change gear pinion 48 meshing with a change gear 49 on the end of an auxiliary shaft 50 having bearings in the bracket 47 and an arm 51 of the bracket 43.

The forwardly extending brackets 39 and 47 provide bearings for the lead screws 7 for longitudinal movements of carriage 4 and for the spline shaft 13 for transverse movements of the slide 8. These brackets 39 and 47 also provide a support for a longitudinally extending auxiliary shaft 52 (see Figs. 1, 2 and 3), which, as will be seen in Fig. 1, carries at its right end a gear or pinion 53 meshing with a gear 54, secured to the adjacent end of the lead screw 7 so that the latter may be rotated by rotation of the auxiliary shaft 52 from either end.

Returning to the shaft 38 at the right end it will be seen that it has mounted thereon bevel pinions 55 and 56, which mesh respectively with bevel gears 57 and 58 secured to corresponding clutch magnets 59 and 60. These clutch magnets (59 and 60) rotate freely on the right hand ends of the auxiliary shaft 52 and the splined shaft 18 and cooperate with their corresponding clutch armatures 61 and 62 slidably keyed respectively to the shafts 52 and 18 so that when the respective clutch magnets 59 and 60 are energized, the armatures are gripped and the shafts 52 and 18 connected thereto are rotated. Accordingly, by means of the gears 53 and 54, the lead screw 7 is rotated for longitudinal rapid traverse movement of the carriage 4 to the right. Rotation of the shaft 18 will, through rotation of the gears 13, 16, 17, withdraw the cross slide 8 and, since the speed is higher, provide for rapid traverse movement of this slide 8 away from the work.

At the left end of Fig. 1 the shaft 50 has mounted thereon bevel pinions 63 and 64 which mesh respectively with gears 65 and 66, secured to corresponding clutch magnets 67 and 68, which are mounted to rotate respectively on the ends of the auxiliary shaft 52 and the spline shaft 18. The clutch magnets 67 and 68 cooperate respectively with clutch armatures 69 and 70 slidably mounted on the left ends of the shaft 52 and 18 for rotating the respective shafts when the corresponding clutch magnets 67 and 68 are energized. The gearing connections (44, 45, 48, 49, 63, 64) are so arranged as to materially reduce the speed of rotation, and rotation of the clutch 67 when energized will rotate the lead screw 7 for slow feeding movement of the main slide or carriage 4 to the left; and similarly, rotation of the clutch magnet 68 when energized is adapted to rotate the feed screw 12 of the cross slide 8 for normal feeding movement inward directly toward the work.

It is preferable in lathes of this character where the object is the duplication of work of a fixed size and shape, in order to speed up the output, to operate the feed screws for transverse and longitudinal movements at normal speeds during the forward or cutting portions of the cycle and at higher out and return speeds, that is, rapid traverse for withdrawing the tool 10 after each cut and for returning the tool and slides 4 and 8 to the initial or starting position of the cycle. Accordingly, the gearing connections (34, 35, 55, 56) from the right end of the longitudinal shaft 33 for rotating the clutches 59 and 60 provides for high speed or rapid traverse to the right for the longitudinal carriage 4 and out movement for the cross slide 8. Thus, as just explained, the intermediate and change gears 44, 45, 48 and 49, at the left end of Fig. 1 provide for a relatively slower speed of rotation of the respective clutch magnets 67 and 68 to provide for normal cutting feeds longitudinally and transversely of the carriage 4 and slide 8, and as previously explained, by means of the change gears 48, 49, the normal feed may be varied as required.

Thus it will be seen that by utilizing magnetic clutches for operating the respective feed screws for the transverse and longitudinal movements of the tool 10 relative to the work, an effective automatic control of the movements can be obtained by controlling the energization of the respective magnetic clutches so that the movements follow in prearranged sequence through a cycle from an initial position for turning or cutting the work in successive steps and then back to the initial position.

Preferably, in this embodiment, the lathe tool on starting from an initial outer position is first moved by one of the electromagnets in to position the tool at the proper distance from the axis of the work for the first cut, then through longitudinal movement of carriage 4 is moved to the left for cutting the first step; the tool is then moved out or withdrawn radially from the work and again moved inward to the proper depth for the second cut while longitudinal movement is stopped; this being followed by movement to the left for cutting the second step, and this sequence of movements longitudinally and radially is repeated for as many steps as may be required. As explained, later, when the last longitudinal movement of the tool is completed the next outward movement of the tool will be such as to clear the work for return of the tool to its initial position. This return movement of the tool to its initial position will complete the cycle and the machine will stop in proper position ready for the cycle of operations to be repeated upon a new work piece.

For this automatic control and to effect the cycle of successive movements as above outlined, a plurality of circuit contactors and actuators therefor are arranged to be operated respectively by the transverse and longitudinal movements of the tool for controlling the successive movements of the slides. Accordingly, in the present form of the improvement, there is mounted upon the cross slide 8 a forward extension 71 provided with a plurality of T-slots 72 (eight in the present instance) extending transversely of the bed and parallel with the cross slide ways, (see Figs. 1 and 3). A plurality of slide brackets 73 (according to the number of steps to be cut) are arranged to be adjustably mounted in the T-slots 72 and, by means of clamp bolts 74 adapted to be held in any adjusted position on the cross slide. Each of the brackets 73 is arranged to support an actuator stop 75 of any suitable shape but preferably in the form of the anvil of the usual micrometer 76. The micrometer obviously will permit accurate adjustment of the end of the anvil for determining the particular position at which a contactor will be operated.

As many micrometer stops 75 may be employed as may be required to control the in and out movements of the cross slide, according to the number of steps of different diameters that are to be turned on the work. In the present instance a micrometer stop 75 is shown for controlling each movement inward of the slide 8. These stops 75 also are made use of to limit the outward movement of the cross slide when a shoulder on the work is to be formed when the slide 8 is being reset for another diameter.

In Figs. 1 and 3 some of the stops 75 are shown as short rods clamped adjustably in brackets similar to brackets 73, these being suitable where repeated and precise adjustments are not necessary. These stops 75 cooperate with two contactors designated A and B, A limiting the in movement and B limiting the out movement. These contactors comprise pivoted levers 77 and 78 mounted substantially as indicated in Figs. 5 and 6 on the respective pivots 79 and 80 and adapted to be held by springs 81 and 82 to normally close contacts 83 and 84 respectively. As will be pointed out later in connection with the wiring diagram, Fig. 8, these contacts control various relay circuits for limiting the in and out movements of the transverse slide 8. The B contactor, as will be seen in Figs. 3 and 5 is provided with a laterally projecting lug 85 at its forwardly projecting end for cooperation with the body of the stop anvil 75, the upper surface of the end 85 being preferably inclined downward at an oblique angle so that it may successively ride under one of the anvils 75. When the cross slide 8 moves inward one of the anvils 25 engages the end 85 and depresses the forward arm of the B contactor to open the contacts 84 (Fig. 6).

The respective contactors A and B may be mounted in protecting casings 86 and 87, as indicated in Figs. 5 and 6 and mounted on an overhanging supporting arm 88 extending, as will be seen in Figs. 1 and 3, in a longitudinal direction of the lathe, that is, at right angles to the direction of movement of the cross slide 8, from a longitudinally movable slide 89 mounted on longitudinal ways 90 at the front end of the main slide or longitudinal carriage 4. Thus the contactors A and B are held in relatively fixed position transversely but are periodically moved longitudinally by means presently to be described, while the anvil actuators 75 partake of the in and out transverse movements of the cross slide 8. By these means, in a manner to be explained later, the in and out positions of the tool 10 are definitely located.

For controlling longitudinal movements of the main carriage 4, the rear of the lathe is provided with a rearwardly and upwardly extending bracket 91 including a rail 92 (Figs. 2 and 3) having a longitudinally extending T-slot 93 to which, by stud bolts 94, a platform or plate 95, provided with a plurality (eight as shown) of longitudinally extending T-slots 96, may be bolted in any longitudinal position. In the T-slots 96 a plurality of brackets 97 (Fig. 2) may be secured by clamp bolts substantially as shown in Fig. 6 for the similar brackets 73. Each of the brackets 97 is provided with an anvil stop 98 mounted therein as part of a micrometer 99 substantially as shown in Figs. 1 and 3. The eight slots 96 merely indicate the capacity of the present machine for cutting eight steps; and up to this limit as many of the T-slots 96 and the micrometer anvil stops 98 may be used as may be required according to the number of steps to be cut or turned.

The longitudinal movement limiting micrometer stops or actuators 98 are arranged to contact with the end of the C contactor lever 100 (see Fig. 2) pivoted in the casing 101, the C contactor being arranged to close contacts 102 under the action of a spring 103. This C contactor controls certain circuits to be described later in connection with the wiring diagram, Fig. 8. The C contactor 100 in the casing 101 is mounted on the end of an overhanging supporting arm 104 arranged to extend rearwardly over the longitudinally slotted plate 95 from a slide 105 mounted on ways 106 on the main slide or carriage 4 for transverse movement relative thereto, as indicated in Figs. 1 and 3. For starting the return movement of the carriage 4 there is preferably mounted an additional adjustable bracket 107, shown in Fig. 3 on the front face of the plate 95 and provided with a projecting metallic stud having a cylindrical or spherical portion 108 insulated from its bracket and arranged to enter and make contact between a pair of spring contact clips 109 on the rear of the carriage 4. With the stud 108 engaging the clips 109, a circuit, hereinafter described, is closed for initiating the return of the tool to its initial position at the right, ready for the next cycle of movements.

In order to provide for automatically moving the slides 89 and 105 (D and E) for making the successive settings of the contactors A, B and C for the successive steps to be turned and thereby, through these contactors A, B and C, control the successive transverse and longitudinal movements in the prearranged cycle, the respective slides D (89) and E (105) are arranged to be moved simultaneously from one operative position to the next, and then returned to their starting point. At each successive setting of the slides 89 and 105 the contactors A, B and C are brought to positions for operation by successive stops 75 and 98. For this purpose racks 110 and 111 mounted on the slides 89 and 105 respectively are arranged to cooperate with the respective pinions 112 and 113, both of which are arranged to be rotated by the transverse shaft 114 on carriage 4 (Figs. 2 and 3) the pinion 113 for slide 105 being mounted on a laterally extending short shaft 115 carrying a bevel pinion 116 meshing with a similar bevel pinion 117 mounted on the shaft 114, as indicated in Fig. 3.

The shaft 114 for moving the slides 89 and 105 is mounted in suitable bearings 118 on the main slide or carriage 4 and extends transversely thereof and into a casing 119 at the rear of the carriage. The end of the shaft 114 within the casing 119 is provided with a gear 120 for rotating the shaft; the gear 120 meshing with and being driven by another gear 121 (Figs. 2, 3 and 4), the gear 121 being mounted upon a short shaft 122 rotatably supported in bearings in the casing 119. The shaft 122 is also provided at its rear end with a large gear 123 which meshes with a pinion 124, the ratio between the gear and pinion being 8 to 1 in the present described embodiment of the invention. Secured to a short shaft 125 carrying the pinion 124 mounted in the casing is a bevel pinion 126, meshing with a bevel pinion 127 on the end of a vertically disposed driven shaft 128 extending from a clutch unit 129 which may be secured to the rear of the main slide or carriage 4 as indicated in Fig. 2. The clutch shaft 128 is provided with the usual armature member 130, slidably splined thereto for cooperation with clutch magnets 131, the latter being provided with bevel gears 132, driven in the usual way for opposite rotation by a bevel pinion 133, secured to the shaft of a motor 134; the clutch magnets 131 being as usual rotatably mounted upon the shaft 128. By following the train of mechanism just described, it will be apparent that by controlling the energization of the respective clutch magnets 131, the direction of motion for the successive operative positions of the slides D (89) and E (105) and the return thereof may be controlled.

For controlling the amount of movement of the slides D and E for each successive operative position of the respective contactors A, B and C and their starting positions two edge cams M and N are provided (see Fig. 4), the cam member 135 being provided with a single cam lug N (Figs. 4 and 8) arranged to cooperate with a contact lever 137 pivoted at 138 in a frame 139 within the casing 119. A spring 140 is arranged to urge the follower roller 136 inward against the cam member 135 so as to close contacts 141 and in cooperation with the N cam control operating circuits hereinafter described in connection with the wiring diagram.

The shaft 125 with the N—135 cam member and the pinion 124 thereon is arranged to be rotated once for each operative position for the contactor slides D—89 and E—105, the N cam projection being located at one radial point on the cam member 135 and limits the latter to a single rotation. As explained later, as many setting or operative positions for the contactors A, B and C may be provided as may be required for the number of steps to be turned according to the capacity of the particular machine. In the present instance, the actuator plate 71 on the cross slide and the longitudinal actuator plate 95 are provided with eight T-slots for the micrometer actuators so that eight successive positions may be employed, the return of the carriage 4 to the starting position being controlled by stud 108.

Each rotation of the N cam advances the contactors A, B and C to successive operative positions in contact with the series of stops 75 and 98. The circuit for returning the carriage 4 to initial position when stud 108 connects clips 109 also returns the slides D and E to their initial positions.

The M cam is limited in the embodiment illustrated to seven forward steps or movements by being mounted on the shaft 122 which by carrying gear 123 makes one-eighth of a rotation for each rotation of the cam N, the cam member 142 having a single tooth-like cam lug M arranged to cooperate with a cam follower roller 143 mounted on a contact lever 144, pivotally mounted at 145 in a contact box 146, as shown in Fig. 4. The contact lever 144 is connected with a spring 147 adapted when the cam roller 143 is off the M cam to close a pair of contacts 148 for controlling certain circuits as represented in Fig. 8 of the drawings, which will be discussed later.

The cam 142—M will be referred to as the reverse sequence set cam and the contacts 148 will be normally closed except when the tool is in the initial or starting position, at which time the projection M of cam 142 is under the roller 143. In the present arrangement as previously explained, seven successive operative positions are provided for of contactors A, B and C, that is the gear 123 which rotates the cam 142—M is provided with eight times as many teeth as the pinion 124, hence, while the cam 135—N, which will be designated the sequence set interlock cam, makes one rotation for each successive position of the contactors A, B and C as previously explained, the reverse sequence set cam 142—M is advanced one-eighth of a rotation for each set. Therefore, in seven successive sets the M cam member 142 would not make a complete rotation, thus as explained later, the cam 142—M would open the contacts 148 only at or upon return to initial position.

The cross slide 8, as will be seen in Fig. 1, is preferably provided with an out limit switch comprising an arm 149 mounted on the slide and having a cylindrical end 150 of insulating material arranged to cooperate with and separate a pair of circuit closing spring contact members 151, to break the circuit of the clutch magnet effecting the outward motion of the cross slide 8. This circuit including the limit switch contacts 151 for the cross slide 8 is more particularly shown in Fig. 8.

Referring again to Fig. 1, it will be seen that the main or longitudinal carriage 4 is provided with a return limit switch 152 pivotally mounted thereon for closing and opening certain circuits as shown in the wiring diagram, Fig. 8, the switch lever 152 being provided with a follower roller 153 arranged to cooperate with an adjustable operating dog 154 mounted for longitudinal adjustment in any suitable manner such as on the rod or support 155 to which it may be secured in any adjusted position by a set screw 156, the arrangement being such that the initial position or the limit of the return movement of the longitudinal carriage may be varied, while establishing the initial position from which the cycle of movements is started.

The operation of the various contactors, the movements of slides D and E carrying contactors A, B and C, and the cams M and N by means of which the slides D and E are controlled will be clear upon inspection of the diagrammatic view of these members shown in Fig. 9.

Referring to the wiring diagram, Fig. 8, it will be seen that the circuits shown are divided into two groups, viz.: control circuits and operating circuits. The control circuits include all relay circuits that originate from the generator 163 and are indicated by light lines. The clutch magnet circuits constitute the operating circuits and are indicated by heavy lines.

It will be seen by examination of Fig. 8 that the control wiring is laid out upon the "ground" system. One side of the generator 163 is connected to ground at 234, the ground in this case meaning the heavy metallic body members of the machine, so that to complete a circuit it is only necessary to connect any part of the wire 235 to any part of the machine.

The operating circuits are carried through in the customary way, two wires being used, neither of which are grounded to the machine.

Referring to the control circuits shown in Fig. 8, it will be seen that the wire 235 connects to one side of the generator 163 and to one side of the magnet coils of the relays OK, IK, IR, LF, Start, Stop, QS, SK, RQ and LK. These relays control the magnet clutches for effecting the movements of the carriage 4, the tool slide 8 and the sequence set cams M and N (142 and 135). Consequently to operate any one of these relays it would be necessary only to connect the other pole of the relay to some part of the machine. The A contactor through the wire 257 completes the circuits to relays LK and IR. If this contactor A is closed the relay IR is closed and the relay LK is open. The B contactor connects the relays QS, Stop and OK to ground through the wire 249. The wire 249 also has another possible ground connection through the lever 137 of the sequence set cam N. The C contactor connects the relays LF, Start and IK to ground through the wire 241. The ground to complete the circuits to relays RQ and SK includes wire 262 and goes through the sequence set interlock 263 which is associated with the right limit switch 227, also through the contacts 148 of the arm of the reverse sequence set cam M.

Taking up the operating circuits, the line wires L+ and L− come through the customary main switch 157. From the main switch 157 the L+ wire connects to one side of the motor 162 of the motor generator set, also to one side of each of the clutch magnets In, Out, Left, Right, SS and RS. These are permanent connections, the control of their magnets being all through the L-line. Another branch of L+ goes to one side of the coil of the main interlock MK, also to one side of the coil 170 of the reversing switch RSw, also to one side of reversing switch fingers 109 and to one pole of the three-way manually operated switch 182.

The minus wire L− after leaving the main switch 157 connects to the terminal 185 of the main interlock MK, also connects to the walking beam 222 of the reversing switch RSw and then connects through the resistance 173 to the upper terminal of the reversing switch coil 175. From this terminal a wire 180 connects to the right pole of the three-way manual switch 182. The bottom terminals of the reversing switch coils 170 and 175 are connected together by the wire N—1. A branch of this wire goes to the upper finger of the reversing fingers 109 and from fingers 109 to the switch bar 181 of the switch 182.

The coils 170 and 175 of the reversing switch RSw are connected in series as will be readily seen from Fig. 8. It will also be seen that by connecting the wire N—1 with the wire 180 through the manual switch 182 the coil 175 will be shunted, so that no current will flow through this coil, the circuit being from L− through resistance 173, wire 180, through switch lever or bar 181 of switch 182, through wire N—1 to the bottom terminal of coil 170. After passing through the coil 170 the circuit extends to the L+ line. The shunting of coil 175 permits coil 170 to raise the plunger 220 of the walking beam and thereby close the L− to the wire 166. The plunger 221 is raised by the shunting of the coil 170 by connecting the wire N—1 to L+ either through the reversing fingers 109 or through the switch lever 181 of the manual switch 182. The circuit of the coil of the main interlock MK is completed by the raising of the plunger 220 and closing L− to wire 166.

One branch of the L− line connects with contact 185 of the main interlock MK. The L− line when this interlock is closed connects to wire 186 which supplies current to the armature of the relay OK and through wire 189 to armature of the relay IK, to wire 192, to armature of relay IR, thence to the in clutch magnet. The L− line also connects to wire 197 which in turn connects to the armature of relay LK, and armature of the Start, Stop and QS relays.

The wire 197 connects through the armature of relay LK to wire 201 and wire 201 connects to armature of relay LF. Through the armature of relay LF wire 201 connects to wire 204 which connects to the magnetic clutch Left for feeding the carriage 4 to the left. Wire 197 also connects through the armature of the Start-Stop relay to the wire 217 which connects the Out magnetic clutch through the out limit switch 151. Wire 197 also connects through the armature of the relay QS to wire 210 and this wire 210 connects to the sequence set magnet SS.

When the reversing switch RSw is closed with the plunger 221 moved upward to contact with wire 226, we have two circuits; one circuit extends from 226 to the armature of relay RQ through this armature to wire 232 directly to the reverse sequence magnet RS back to L+ line. The other circuit extends through the right limit switch points 227 to the wire 228 directly to the Right magnetic clutch for movement of carriage 4 toward the right.

Should it be necessary to stop operation of the machine at any point during its cycle of operation and return the tool 10 to its initial position, it is only necessary to move the starting lever or switch 181 toward the left.

Referring to Fig. 8 it will be seen that through the A contactor and wire 257 the relay LK will be open and relay IR will be closed. Through the B contactor and wire 249 the Start-Stop relay will be open. The relay SK will be open through the ground of the right limit switch and sequence set interlock 152 and wire 262. Through the C contactor and wire 241 the Start-Stop relay is open. Relay LF and relay IK are both closed. Relay OK is closed for the reason that relay SK is open, the main interlock MK is also open. To start the machine the switch bar or lever 181 of the three-way switch 182 is moved to the right into contact with terminal 180 connecting wire N—1 with wire 180 and thereby shunting coil 175 of the reversing switch RSw. The plunger 220 therefore closes to wire 166 thus closing the contacts of the main interlock MK. The relays QS, Stop and LK are open so that the wire 197 has no current flow. The relay OK is closed and also relay IK and IR, consequently there is a current flow from L− line through 185, 186, 189, 192, 255, through the In magnetic clutch to the L+ line. The cross slide moves inward and the B contactor is opened by sliding under the second micrometer stop 75 until stopped by the opening of the A contactor.

Upon the opening of the A contactor the relay IR is opened, stopping the inward motion. The relay LK then closes giving a completed circuit from wire 197 to the armature of the LK relay, wire 201, the armature of LF relay to wire 204, through the Left magnetic clutch to the L+ line. The carriage now moves to the left. During this movement the contact 263 of right limit switch and sequence set interlock 152 is opened thereby closing the relay SK. The carriage continues its movement until stopped by the opening of the C contactor.

Upon the opening of the C contactor the circuit is interrupted to the relay LF which opens, stopping the carriage movement to the left. This also opens the relay IK and closes the Start-Stop relay connecting wire 197 through wire 217 and the out limit switch 151 and wire 217 to the Out magnetic clutch. The cross slide 8 now moves out until stopped by the closing of the B contactor by running off the end of a micrometer stop 75. Upon the closing of the B contactor the QS relay is closed and the OK relay is opened. The closing of the QS relay connects wire 197 to wire 210 completing the circuit through the SS magnet to the L+ line. The sequence set slides D and E then move from their first position to a second position, and the M and N cams rotate as the slides move. The M cam closes the contacts 148 to close the circuit to the RQ relay, but as contacts 263 are open no current flows through the coils of the armature of this relay. The reverse movement of the M and N cams does not take place. The contacts of the N cam close, the B contactor is again opened by the next stop 75, the sequence set slides D and E continue to move until stopped by the opening of the ground contacts of the N cam, which open the QS relay. During the movement of the sequence set slides D and E and A and C contactors have again closed due to their changed position. The tool slide 8 and carriage 4 now go through the same cycle inward to the Left, Stop and Out after which the slides D and E again move, this cycle taking place until the reversing fingers 109 are closed by the stud 242. This shunts the coil 170 of the reversing switch RSw and the plunger 221 connects with wire 226. This connects through contacts 227 to wire 228 which connects to the Right magnet clutch. The carriage 4 thus moves to the right until stopped by the opening of the contacts 227. When the contacts 227 open, the contacts 263 close, thereby opening relay SK, the contacts 148 being closed, because the roller is off the projection of the M cam. Relay RQ closes connecting wire 226 to wire 232 which connects to reverse sequence set magnet RS, the sequence set slides D and E move back until stopped by the opening of the contacts 148 of the M cam. Opening of these contacts releases the RQ relay. The machine is then ready for loading the next work piece and for again being started in another cycle of operation.

By the return of the setting slides D and E to starting positions the contactors A, B and C are all closed. The finished work may now be removed from the lathe and a new piece inserted, then by again moving the manual starting switch 181 to the right, the cycle will be repeated.

While one mechanical embodiment and circuit arrangement therefor has been described for carrying out the invention, it will be understood that any required modifications and adaptations thereof for application of the improvement to various types of machine tools and for varying the number and arrangement of the successive steps to be cut, may be made without departing from the spirit and scope of the invention.

What I claim is:

1. In combination in a machine tool having a tool, means to support and rotate a work piece, means to actuate the tool longitudinally and transversely of the work, a switch controlling the operation of said moving means for longitudinal movement, spaced stops for intermittently actuating said switch, means for moving said tool transversely of the work by said moving means when the switch is opened by said stops, and a second switch operable at the end of the longitudinal movement when the first switch is opened to cause said tool moving means to move the tool backwardly longitudinally of the work.

2. In combination in a machine tool having a tool, means to support and rotate a work piece, means to actuate the tool longitudinally and transversely of the work, a switch controlling the operation of said moving means for longitudinal movement, spaced stops for intermittently actuating said switch, means for moving said tool transversely of the work by said moving means when the switch is opened by said stops, a second switch operable at the end of the longitudinal movement when the first switch is opened to cause said tool moving means to move the tool backwardly longitudinally of the work, and means for simultaneously accelerating the tool moving means to accelerate a rapid return.

3. In combination, a tool moving motor, a plurality of electrically-operated clutches for moving said tool laterally of the work in one direction transversely of the work and laterally of the work in the other direction, switches for controlling said electrically-operated clutches, and stop means adapted to actuate said switches at predetermined intervals, one switch engaging stops for alternate longitudinal and transverse movements and another switch engaging stops to limit longitudinal movements.

4. In combination in a machine tool having a carriage and slide carrying the tool for longitudinal and transverse movement, and means for rotatably supporting the work piece, a motor actuating said carriage and slide, magnetic clutches for left hand longitudinal movement, right hand longitudinal movement of the carriage, and transverse movement of the tool slide, a switch for controlling the first and third clutches, stop means for actuating said switch at intervals, a second switch for controlling the right hand longitudinal clutch for return tool movement, and stop means for actuating said switch.

5. In combination in a machine tool having a carriage and slide carrying the tool for longitudinal and transverse movement, and means for rotatably supporting the work piece, a motor actuating said carriage and slide, magnetic clutches for left hand longitudinal movement, right hand longitudinal movement of the carriage, and transverse movement of the tool slide, a switch for controlling the first and third clutches, stop means for actuating said switch at intervals, a second switch for controlling the right hand longitudinal clutch for return tool movement, and stop means for actuating said switch carried by said tool.

6. In an electric circuit, a motor, a pair of shafts, a left longitudinal magnetic clutch to connect the motor to one shaft, a right longitudinal magnetic clutch to connect the motor to the other shaft, a transverse magnetic clutch to connect the motor to said one shaft, a switch intermittently operating alternately the first and third clutches, a reversing switch rendering the first and third clutches inoperative and rendering the second clutch operative.

7. In a combination in a machine tool of a longitudinally movable carriage, a transversely movable slide carrying a tool mounted on the carriage, a switch carried on the slide controlling the longitudinal movement of the slide and carriage and the transverse movement of the carriage, a plurality of stationary stops mounted at spaced intervals adapted to engage said switch at intervals whereby, while the switch is engaged by a stop, the slide will move transversely, and when the switch is disengaged from a stop the carriage and slide together will move longitudinally in a given direction.

8. In combination, in a machine tool having a tool, means to rotate a work piece, means to cut the work with different diameters including electrically driven means for moving the tool longitudinally and transversely of the work, said last named means including a plurality of stops, and switches controlling said electrically driven means actuated by said stops during the tool movement, whereby said tool is successively moved longitudinally and transversely of the work.

9. In combination, in a machine tool having a tool, means to rotate a work piece, means to cut the work with different faces and different diameters including electrically driven means for moving the tool longitudinally and transversely of the work, said last named means including a plurality of stops, and switches controlling said electrically driven means actuated by said stops during the tool movement, whereby said tool is successively moved longitudinally and transversely of the work.

10. In combination, in a machine tool having a tool, means to rotate a work piece, means to cut the work with different diameters including electrically driven means for moving the tool longitudinally and transversely of the work, said last named means including a plurality of adjustable stops, and switches controlling said electrically driven means actuated by said stops during the tool movement, whereby said tool is successively moved longitudinally and transversely of the work.

11. In combination, in a machine tool having a tool, means to rotate a work piece, means to cut the work with different diameters including electrically driven means for moving the tool longitudinally and transversely of the work, said last named means including a plurality of micrometer stops, and switches controlling said electrically driven means actuated by said stops during the tool movement, whereby said tool is successively moved longitudinally and transversely of the work.

12. In combination, in a machine tool having a tool, means to rotate a work piece, means to cut the work with different diameters including electrically driven means for moving the tool longitudinally and transversely of the work, said last named means including a plurality of adjustable micrometer stops, and switches controlling said electrically driven means actuated by said stops during the tool movement, whereby said tool is successively moved longitudinally and transversely of the work.

13. In combination, in a machine tool having a tool, means to rotate a work piece, means to cut the work with different diameters including electrically driven means for moving the tool longitudinally and transversely of the work, said last named means including a plurality of stops, switches controlling said electrically driven means actuated by said stops during the tool movement, and stop means for actuating said switch means whereby said tool is successively moved longitudinally and transversely of the work.

14. In combination, in a machine tool having a tool, means to rotate a work piece, means to cut the work with different diameters including means for moving the tool longitudinally and transversely of the work, said last named means including a plurality of stops, and switch means actuated by said stops during the tool movement, magnet clutches operated by said switches to control said means for moving the tool, whereby said tool is successively moved longitudinally and transversely of the work.

15. In combination, in a machine tool having a cutting tool, means to rotate a work piece relative thereto, electric power means for moving the tool longitudinally and transversely of the work, magnet clutches associated with said electric power means, a plurality of stops, switch means actuated by said stops during the tool movement, said switch means being adapted to control said magnet clutches whereby said tool is successively moved longitudinally and transversely of the work.

16. In combination, in a machine tool having a tool, means to rotate a work piece, means to cut the work with different diameters including means for moving the tool longitudinally and transversely of the work, said last named means including a plurality of stops, and switch means actuated by said stops during the tool movement, electrical feed devices operated by said switches to control said means for moving the tool, whereby said tool is successively moved longitudinally and transversely of the work.

17. In combination, in a machine tool having a cutting tool, means to rotate a work piece relative thereto, electric power means for moving the tool longitudinally and transversely of the work, electrical feed devices associated with said electric power means, a plurality of stops, switch means actuated by said stops during the tool movement, said switch means being adapted to control said electrical feed devices whereby said tool is successively moved longitudinally and transversely of the work.

18. In combination, in a machine tool having a cutting tool, a single electric motor drive, a carriage, a tool slide carrying the tool, a feed rod actuating the slide, a lead screw actuating the carriage, magnet clutches controlling the direction of movement of said rod and screw as driven by said electric motor, limit switch means operating said clutches, said switch means being actuated by the movement of the carriage and the slide, and a series of stops for actuating one of said switch means.

19. In a machine tool, the combination of a support for rotating the work, a support for the tool, magnetic clutches for effecting longitudinal and transverse movements between the tool and the work, circuits for operating said magnetic clutches, relays controlling said clutch circuits, circuits for operating said relays, and switches operated by movements of the respective supports for controlling operation of said relays so that said longitudinal and transverse movements follow in a prearranged cycle for cutting successive steps in the work.

20. In a machine tool as in claim 14, in which switches controlling electric circuits effect the longitudinal and transverse movements in a prearranged cycle, a manual switch for starting the cycle of movements, and means for completing the cycle automatically.

21. In a machine tool, the combination of a support for the work, a support for the tool, magnetic clutches for effecting relative longitudinal and transverse movements between the tool and the work, circuits and relays for operating the magnetic clutches, circuits for operating said relays, switches for controlling said relay operating circuits, said switches being arranged to be operated by the respective supports in their movements, and means for predetermining a prearranged cycle of movements for cutting successive steps in the work and for effecting the return of the supports to their initial positions at the completion of the cycle.

22. In a step cutting machine tool the combination of a support for the work, a support for the tool, magnetic clutches for effecting relative feed movements of said supports longitudinally and transversely of the work, circuits for energizing the magnetic clutches to effect the respective movements of said supports, and switches for controlling said circuits, said switches being arranged to be operated by the supports in their relative movements for controlling energization of the respective magnetic clutches in prearranged sequence for cutting the desired steps in the work.

23. In a step cutting machine tool the combination of a support for the work, a support for the tool, magnetic clutches for effecting relative feed movements of said tool support longitudinally and transversely of the work, circuits and relays for operating the respective magnetic clutches, switches controlling said circuits, a plurality of variably positionable switch actuators arranged to operate the switches by relative movements of the supports for controlling said movements, and means for effecting said movements transversely and longitudinally in prearranged sequence.

24. In a step cutting machine tool the combination of a support for the work, a support for the tool, magnetic clutches for effecting relative longitudinal and transverse feed movements between said supports, circuits for operating the respective magnetic clutches, relays controlling operation of the clutch circuits, switches controlling circuits for operating said relays, switches operating means controlled by the supports in their movements for determining the sequence of operation of said switches for controlling said movements longitudinally and transversely so as to cut the work in prearranged steps.

25. In a step cutting lathe the combination of a rotatable support for the work, supports for moving the tool relative to the work, magnetic clutches for effecting relative movements of said tool supports longitudinally and transversely of the work in successive steps, circuits for operating the respective magnetic clutches to effect said movements, relays for controlling the clutch circuits, circuits for operating said relays, and switches controlled by movements of said supports for operating said relays in prearranged sequence for effecting the feed movements transversely and longitudinally in prearranged steps.

26. In a step cutting lathe the combination of a rotatable support for the work, supports for moving the tool longitudinally and transversely of the work, magnetic clutches for effecting relative movements of said supports, circuits for energizing the magnetic clutches, relays for controlling the respective clutch circuits, switches controlling operation of said relays for effecting relative movements of said supports transversely and longitudinally in prearranged sequence, and automatic means controlling operation of said switches so that the respective movements follow a cycle from an initial position back to initial position while cutting a succession of steps in the work.

27. In a step cutting lathe the combination of a rotatable support for the work, supports for moving the tool longitudinally and transversely of the work, magnetic clutches for effecting relative movements of said supports, circuits and relays for controlling operation of the respective magnetic clutches, switches controlling said circuits and relays, a plurality of switch actuators arranged to cooperate with certain of said switches by transverse movements of the tool for controlling certain movements, a plurality of switch actuators arranged to cooperate with certain other switches by longitudinal movements of the tool for controlling other movements and switch actuators cooperating with additional switches for initiating and limiting return movement of the tool to the initial or starting position.

28. In a step cutting lathe the combination of a rotatable support for the work, supports for moving the tool longitudinally and transversely of the work, magnetic clutches for effecting relative movements of said supports, circuits for operating said magnetic clutches, relays controlling operation of said clutch circuits, switches and circuits for operating said relays in prearranged sequence, adjustable actuators for operating certain of said switches for controlling transverse movements of the tool, adjustable actuators for operating other of said switches for controlling longitudinal movements of the tool, means controlled by movements of said supports for the relative positioning of the actuators and switches so that the respective switches may be actuated in predetermined sequence.

ROBERT D. SHAW.